(12) United States Patent
Brabec et al.

(10) Patent No.: US 11,879,788 B2
(45) Date of Patent: Jan. 23, 2024

(54) METHOD TO MINIMIZE THE TEMPERATURE DRIFT OF OPTICAL TURBIDITY SENSORS

(71) Applicant: emz-Hanauer GmbH & Co. KGaA, Nabburg (DE)

(72) Inventors: Martin Brabec, Nabburg (DE); Manfredi Signorino, Wackersdorf (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 133 days.

(21) Appl. No.: 17/467,321

(22) Filed: Sep. 6, 2021

(65) Prior Publication Data

US 2022/0090969 A1    Mar. 24, 2022

(30) Foreign Application Priority Data

Sep. 11, 2020    (DE) .................... 10 2020 123 715.4

(51) Int. Cl.
*G01K 13/02*    (2021.01)
*D06F 34/22*    (2020.01)
(Continued)

(52) U.S. Cl.
CPC .......... *G01K 13/02* (2013.01); *A47L 15/4297* (2013.01); *D06F 34/22* (2020.02);
(Continued)

(58) Field of Classification Search
CPC .. D06F 34/22; D06F 2103/20; A47L 15/4297; G01N 21/59; G01N 21/274;
(Continued)

(56) References Cited

U.S. PATENT DOCUMENTS

| 4,072,424 A * | 2/1978 | McMullan ......... G01N 21/8507 |
| | | 356/442 |
| 8,169,622 B1 * | 5/2012 | Reith ................... G01N 21/534 |
| | | 356/601 |

(Continued)

FOREIGN PATENT DOCUMENTS

| FR | 3048785 A1 | 9/2017 |
| JP | 2010003718 A | 1/2010 |

(Continued)

*Primary Examiner* — Benjamin L Osterhout
(74) *Attorney, Agent, or Firm* — Hayes Soloway PC

(57) ABSTRACT

A sensor suitable for optical turbidity measurements is described. The sensor is suitable for use in a water-bearing domestic electrical appliance (e.g. washing machine or dishwasher) and allows the temperature dependence of the turbidity measurements obtained by means of a first light detector to be compensated for. To this end, the sensor implements, in addition to a turbidity-measuring path along which a measuring-light beam is sent through a measuring space containing the turbid medium to a first light detector, a reference measuring path along which a reference light beam is transported to a second light detector which is thermally coupled with the first light detector. A heat-equalizing element can ensure that any temperature differences between the two light detectors are minimized. Both light-measuring paths can run in some regions inside the same solid-material light-conducting structure.

19 Claims, 8 Drawing Sheets

(51) Int. Cl.
*G01N 21/59* (2006.01)
*A47L 15/42* (2006.01)
*D06F 103/20* (2020.01)
*G01N 21/27* (2006.01)
*G01N 21/53* (2006.01)

(52) U.S. Cl.
CPC ......... *G01N 21/59* (2013.01); *D06F 2103/20* (2020.02); *G01K 2207/00* (2013.01); *G01N 21/274* (2013.01); *G01N 21/534* (2013.01); *G01N 2201/1211* (2013.01)

(58) Field of Classification Search
CPC ......... G01N 21/534; G01N 2201/1211; G01K 2207/00; G01K 13/02
See application file for complete search history.

(56) References Cited

U.S. PATENT DOCUMENTS

| | | | | |
|---|---|---|---|---|
| 9,651,534 | B1* | 5/2017 | Ehlert | G01N 21/78 |
| 10,130,238 | B2* | 11/2018 | Durham | A47L 15/0031 |
| 2012/0001099 | A1* | 1/2012 | Schenkl | A47L 15/4297 |
| | | | | 250/574 |
| 2012/0113427 | A1* | 5/2012 | Reith | G01N 21/534 |
| | | | | 356/442 |
| 2014/0264077 | A1 | 9/2014 | Tokhtuev et al. | |

FOREIGN PATENT DOCUMENTS

| | | |
|---|---|---|
| KR | 20090122026 A | 11/2009 |
| TW | M494264 U | 1/2015 |

* cited by examiner

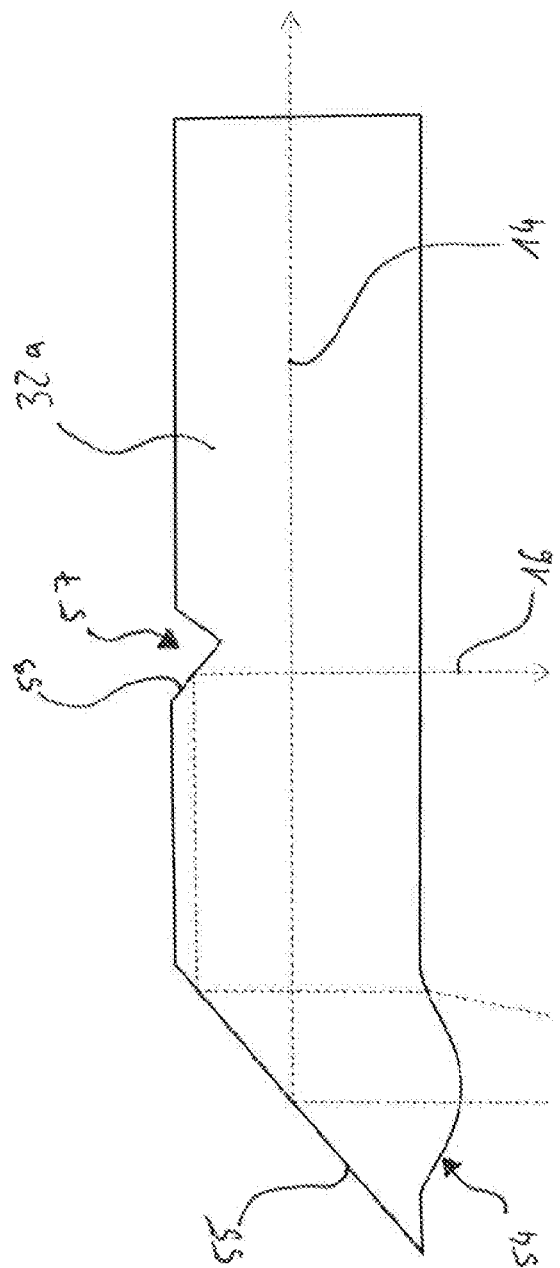

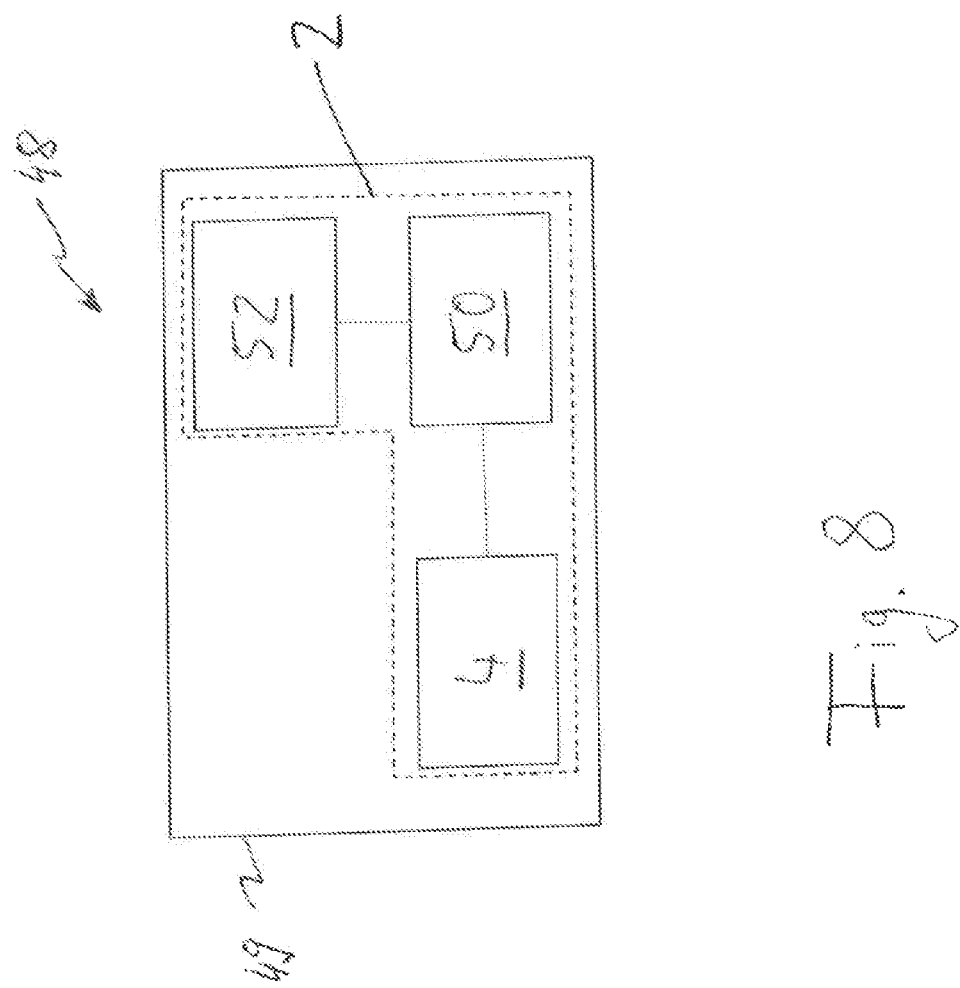

METHOD TO MINIMIZE THE TEMPERATURE DRIFT OF OPTICAL TURBIDITY SENSORS

CROSS-REFERENCE TO RELATED APPLICATIONS

This patent application claims priority from German Patent Application No. 102020123715.4 filed Sep. 11, 2020. This patent application is herein incorporated by reference in its/their entirety.

FIELD OF THE DISCLOSURE

The invention relates to a sensor arrangement for optical turbidity measurements in a domestic electrical appliance. The invention relates further to a domestic electrical appliance equipped with such a sensor arrangement.

BACKGROUND

In water-bearing domestic electrical appliances such as in particular washing machines and dishwashers, the turbidity of the working water (wash water in a washing machine, dishwashing liquor in a dishwasher) is measured by means of a measuring light beam which is sent through the working water. The more soiled (turbid) the working water, the more the measuring light beam is attenuated and the weaker an electrical measurement signal emitted by a photodetector. Operation of the domestic appliance can be controlled in dependence on the turbidity of the working water detected by measurement. For example, a further washing operation can be carried out if pronounced soiling is ascertained, or other measures can be instigated, such as, for example, the metering of a larger quantity of a cleaning substance. For the prior art relating to conventional turbidity sensors for use in water-bearing domestic cleaning appliances, reference may be made, for example, to EP 1 335 060 B1.

It has been shown that conventional turbidity sensors, which measure the light transmission through a liquid medium to be tested, can exhibit a disruptive temperature dependence of the electrical measurement signals delivered thereby. Despite constant turbidity conditions, the electrical measurement signal may thus be subject to fluctuations, according to the temperatures to which the turbidity sensor is exposed. In domestic washing machines, washing programs that operate with maximum temperatures in a range between approximately 30 and 90° C. are conventional; modern dishwashers provide dishwashing programs with maximum temperatures in a range between approximately 40 and 70° C. However, the maximum temperature of the working water can not only vary from operating program to operating program; even while an operating program is running, the working water is generally not always at the same temperature—the maximum temperature is often reached only during a partial phase of the operating program. Since the turbidity sensor is generally in direct contact with the working water of the machine, the electronics accommodated in the turbidity sensor can also be exposed to significantly different temperatures, depending on which operating program is running at the time and which phase of an operating program the machine is in at the time.

SUMMARY

It is an object of the invention to provide a sensor arrangement suitable for optical turbidity measurements, which permits constantly reliable measurement results.

In order to achieve this object, the invention provides according to a first aspect a sensor arrangement for optical transmission measurements in a domestic electrical appliance, which sensor arrangement comprises a sensor having a sensor housing and, accommodated therein, a light-emitting component arrangement and two light-receiving elements. The sensor defines two light-measuring paths, of which a first transports light from the light-emitting component arrangement to a first of the light-receiving elements but not to the second of the light-receiving elements, and the second light-measuring path transports light from the light-emitting component arrangement to the second of the light-receiving elements but not to the first of the light-receiving elements. The first light-measuring path passes on a portion of its path length through a measuring space outside the housing.

For example, the second light-measuring path satisfies at least one of the following conditions:
- the second light-measuring path runs over its entire path length inside and at a distance from an outer surface of the sensor housing;
- no portion of the light running along the second light-measuring path leaves the sensor housing;
- no portion of the light running along the second light-measuring path passes through a space outside the housing which would be fluidically connected to the measuring space outside the housing;
- an intensity of light which is received by the second light-receiving element via the second light-measuring path is unaffected by a medium through which the first light-measuring path passes in the measuring space outside the housing.

These features are based on the idea of providing, in addition to the first light-measuring path, a second light-measuring path which can serve as a reference path in order to compensate for a temperature dependence of measured values which are based on measurements along the first light-measuring path. The reference path is expediently exposed to the same or at least sufficiently similar temperature conditions as the first light-measuring path. By using for the reference path electrical or/and optoelectronic components which exhibit a sufficiently similar temperature behavior to the corresponding electrical or/and optoelectronic components of the first light-measuring path, measured values that are based on measurements along the second light-measuring path are affected by substantially the same temperature dependence as the measured values obtained on the first light-measuring path. Heat-related errors of measurement therefore occur not only in the measured values of the first light-measuring path but also in the measured values of the second light-measuring path. However, the second light-measuring path is so defined that the measured values obtained thereon are not subject to the turbidity influences by the medium in the measuring space outside the housing to which the measured values obtained on the first light-measuring path are subject. Consequently, the measured values of the first light-measuring path contain information about the turbidity of the medium in the measuring space outside the housing, but the measured values of the second light-measuring path contain no such turbidity information. The measured values obtained on the second light-measuring path therefore allow the measured values obtained on the first light-measuring path to be corrected in the sense of eliminating or at least reducing to the greatest possible extent the temperature dependence of the measured values of the first light-measuring path, while the turbidity information is still contained in the measured values of the first light-measuring path. The temperature correction can involve, for example, determining a difference or/and a quotient between a measured value of the first light-measuring path and a measured value of the second light-measuring path.

Measures for configuring the second light-measuring path as a suitable reference path for temperature compensation of the first light-measuring path can comprise one or more of the following: (1) the second light-measuring path runs wholly inside the sensor housing, that is to say does not penetrate the housing wall of the sensor housing at any point; (2) the second light-measuring path runs over its entire path length inside and at a distance from an outer surface of the sensor housing, that is to say although the second light-measuring path can enter the housing wall of the sensor housing, it does not reach the outer surface of the sensor housing at any point and does not pass through the outer surface of the sensor housing at any point; (3) no portion of the light running along the second light-measuring path leaves the sensor housing, that is to say the second light-measuring path does not emerge from the sensor housing to the outside at any point; (4) no portion of the light running along the second light-measuring path passes through a space outside the housing which would be fluidically connected to the measuring space outside the housing, that is to say although it is possible that the second light-measuring path passes through the housing wall of the sensor housing to the outside, the second light-measuring path then enters an external space which is fluidically separate from the measuring space, so that any medium (fluid), whether liquid or gaseous, present in the measuring space during operation of the sensor arrangement does not affect the propagation of the light along the second light-measuring path; (5) an intensity of light which is received by the second light-receiving element via the second light-measuring path is unaffected by a medium through which the first light-measuring path passes in the measuring space outside the housing; (6) the second light-measuring path does not touch or cross any boundary surface that is contacted on one side by the medium in the measuring space outside the housing.

The light-emitting component arrangement can comprise a light-emitting element for jointly feeding light to both light-measuring paths. An influence of differences in radiation characteristics (e.g. wavelength spectrum, light intensity, angle of radiation) of different light-emitting elements on the measured values of the two light-measuring paths can thus be eliminated. The light-emitting element can comprise or be, for example, a light-emitting diode (LED).

In some embodiments, the sensor arrangement comprises a signal evaluation unit which is adapted to determine a derived measured value from the first measured value and the second measured value by forming a difference or a quotient of the first and the second measured values. The signal evaluation unit can be processor-based or be formed by analog electronic components.

The sensor arrangement can further comprise an electronic control unit which is adapted to control the operation of the domestic appliance on the basis of the derived measured value. The control unit can be arranged outside the sensor housing and be electrically connected via a cable connection, for example, to an electronic assembly accommodated in the sensor housing.

In some embodiments, the sensor housing has a housing main part having two housing fingers protruding from the housing main part, wherein the measuring space outside the housing is arranged between the two housing fingers and wherein the first light-measuring path emerges from a first of the housing fingers into the measuring space outside the housing and, after passing through the measuring space outside the housing, enters the second of the housing fingers. In such embodiments, it can be provided that the second light-measuring path does not run in one of the housing fingers at any point of its path length.

In some embodiments, the sensor arrangement comprises a reflection face, formed on the sensor housing or on a light-conducting structure inserted into the sensor housing, for the mirror reflection or total reflection of the light running along the second light-measuring path at a point in a region between the two housing fingers.

Some embodiments provide that a solid-material light-conducting structure is inserted into the sensor housing, which light-conducting structure forms, in association with each of the housing fingers, a light-conducting finger which projects into the housing finger in question, wherein both the light-emitting component arrangement and the first and the second light-receiving elements are arranged in the housing main part (which is configured, for example, in the manner of a housing pot, from the pot base of which the two housing fingers protrude).

In some embodiments, the sensor arrangement comprises a reflection face, wherein a first path portion of the second light-measuring path forms at the reflection face an angle which is greater than 0° and less than 180° relative to an adjoining second path portion of the second light-measuring path. The angle can be between 45° and 135°. For example, the reflection face is so configured and arranged that light transported through the second light-measuring path is reflected substantially completely from the reflection face, for example with total reflection or mirror reflection.

The reflection face can extend substantially parallel with respect to the portion of the first light-measuring path that runs outside the sensor housing. The reflection face can extend substantially parallel to a surface of the second light-receiving element.

For example, the sensor arrangement comprises a beam splitter, which deflects a first portion of light coupled into the beam splitter along the first light-measuring path and deflects a second portion of the light coupled into the beam splitter in a different direction along the second light-measuring path. The beam splitter can be in the form of a prism.

In one example, the sensor arrangement further comprises a first light-conducting body arranged in the sensor housing, wherein the first and the second path portions of the second light-measuring path run inside the first light-conducting body and the reflection face is formed by a surface of the first light-conducting body. The first light-measuring path can run over a portion of its path length inside the first light-conducting body. The beam splitter can be part of the first light-conducting body or vice versa.

The sensor arrangement can further comprise a second light-conducting body arranged in the sensor housing, wherein the first light-measuring path runs over a portion of its path length inside the second light-conducting body, and wherein the reflection face is formed by a reflection element arranged on a surface of the second light-conducting body. The first and the second path portions of the second light-measuring path can each run wholly outside the second light-conducting body. The reflection element is, for example, a mirror, a metal plate, or a metallic surface vapor deposited onto the surface of the second light-conducting body.

For example, the sensor arrangement further comprises a light-impermeable separating wall which is arranged in the sensor housing and extends at least in part between an end segment of the first light-measuring path that ends at the first light-receiving element and an end segment of the second light-measuring path that ends at the second light-receiving element. The separating wall can extend substantially parallel to the end segment of the first light-measuring path and/or to the end segment of the second light-measuring path.

In one example, the sensor arrangement comprises a printed circuit board on which the two light-receiving elements are arranged, wherein a passive heat-equalizing element is arranged on the printed circuit board and between the first light-receiving element and the second light-receiving element. This is to be understood as meaning that the heat-equalizing element does not perform an active cooling or heating function. It is a passive element, in particular a passive electrical element or component.

Measuring signals of the light-receiving elements are usually temperature-dependent. The two light-receiving elements can be identically constructed elements, in particular elements from the same batch. The heat-equalizing element can ensure that the light-receiving elements always have substantially the same temperature, that is to say that a temperature difference between the light-receiving elements is minimized. In particular, a temperature difference between the two light-receiving elements can be minimized during operation of the domestic appliance. This has the effect of minimizing differences between the transmission measurement of the first light-receiving element and the reference measurement of the second light-receiving element that are based solely on temperature differences of the light-receiving elements.

The heat-equalizing element can consist of conductive track material of the printed circuit board. It can be of planar form and have a layer thickness which corresponds to a layer thickness of a conductive track of the printed circuit board, in particular 18 μm, 35 μm, 70 μm or 105 μm. The heat-equalizing element can consist of the same electrically conductive layer that is used to form a conductive track on the printed circuit board, in particular by etching.

The heat-equalizing element can have a thermal conductivity of at least 20 W/m*K. The heat-equalizing element extends in particular between the first light-receiving element and the second light-receiving element. For example, the heat-equalizing element has a thermal conductivity of at least 100 W/m*K, in particular of at least 200 W/m*K, for example of at least 300 W/m*K. The heat-equalizing element can consist of copper or a copper alloy. The heat-equalizing element consists in one example of the same material as one or more conductive tracks which are arranged on the printed circuit board. The heat-equalizing element is, for example, in the form of a thermal coupling layer and is so designed that the first light-receiving element and the second light-receiving element have substantially the same temperature at any time during an operating program of the domestic appliance.

The heat-equalizing element and the two light-receiving elements can be fixed to or arranged on the same surface of the printed circuit board.

For example, the heat-equalizing element extends over a largest possible cohesive surface region of the printed circuit board, which is free of components and conductive tracks fixed to the printed circuit board.

The heat-equalizing element can have at a widest point a width which is greater than a maximum width of each individual conductive track arranged on the printed circuit board.

The width of the heat-equalizing element can be smaller in a first region, which adjoins one of the light-receiving elements, than in a second region, which is spaced further apart from the one of the light-receiving elements.

For example, the heat-equalizing element is adapted to keep a temperature difference between the two light-receiving elements which is caused by temperature changes of a medium in the measuring space during a working cycle of the domestic appliance below a predetermined maximum temperature difference.

The heat-equalizing element can be part of an electric circuit.

The heat-equalizing element can comprise a terminal portion which is connected to an electrode of one of the light-receiving elements. The heat-equalizing element can also comprise a terminal portion which is connected to an electrode of one of the light-receiving elements and further comprise a terminal portion which is connected to an electrode of the other of the light-receiving elements.

The respective terminal portion can have a width which corresponds to a width of the respective electrode. The electrode can be a planar contact pad.

The first light-receiving element and the second light-receiving element can each be in the form of a photodetector. Two photodetector components each forming one of the two light-receiving elements can be arranged on the printed circuit board. They can in particular be phototransistors.

The respective electrode can be a cathode of a phototransistor of the respective light-receiving element.

For example, the photodetector components have a clear mutual spacing of not more than 1.0 cm or not more than 0.8 cm or not more than 0.6 cm. Such a small spacing between the two photodetector components ensures or promotes at least equal temperature conditions at the two photodetector components.

In one example, the sensor arrangement comprises a (e.g. the above-mentioned) solid-material light-conducting structure, wherein both the first light-measuring path and the second light-measuring path run at least in some regions inside the solid-material light-conducting structure.

A compact construction of the sensor arrangement can thus be achieved. In particular, the same radiation source can be used to feed both light-measuring paths. A portion of the light coupled into the light-conducting structure can thereby be conducted in the direction towards the second light-receiving element, that is to say can be used for a reference measurement. A small light portion, starting from the radiation source, can also be reflected at an outer surface of the light-conducting structure to the second light-receiving element. By the additional use of a light portion transported in the light-conducting structure for the reference measurement, the light intensity of the light arriving at the second light-receiving element is increased, and the dependence of the measuring signal thereof on the surface reflectivity of the light-conducting structure is reduced.

The light-conducting structure can have a first reflection face at which only light transported along the second light-measuring path is reflected.

The first reflection face is so configured, for example, that the light transported along the second light path is reflected at the first reflection face by total internal reflection.

A surface of the light-conducting structure can have an indentation, wherein the indentation forms the second reflection face. In other words, the second reflection face can be part of the indentation. For example, the light-conducting structure is an injection-molded part in which the indentation is already introduced during injection molding.

The light-conducting structure can further have a second reflection face at which only light transported along the first light-measuring path is reflected. The second reflection face can be an end face of a light-conducting finger of the light-conducting structure.

For example, the first and the second reflection faces are so configured that light emitted along the second light-measuring path and reflected at the first reflection face runs in a different plane to light emitted along the first light-measuring path and reflected at the second reflection face. The first and the second reflection faces can be at an angle relative to one another. It can thereby be provided that the second light-measuring path does not run in one of the housing fingers at any point of its path length.

According to one example there is provided a sensor arrangement for optical transmission measurements in a domestic electrical appliance, comprising a sensor having a sensor housing and, accommodated therein, a light-emitting component arrangement and two light-receiving elements, wherein the sensor defines two light-measuring paths, of which a first transports light from the light-emitting component arrangement to a first of the light-receiving elements but not to the second of the light-receiving elements, and the second light-measuring path transports light from the light-emitting component arrangement to the second of the light-receiving elements but not to the first of the light-receiving elements, wherein the first light-measuring path passes over a portion of its path length through a measuring space outside the housing, wherein the sensor housing has a housing main part having two housing fingers protruding from the housing main part, wherein the measuring space outside the housing is arranged between the two housing fingers and wherein the first light-measuring path emerges from a first of the housing fingers into the measuring space outside the housing and, after passing through the measuring space outside the housing, enters the second of the housing fingers, wherein there is inserted into the sensor housing a solid-material light-conducting structure which, in association with each of the housing fingers, forms a light-conducting finger projecting into the housing finger in question, wherein both the light-emitting component arrangement and the first and the second light-receiving elements are arranged in the housing main part, wherein the second light-measuring path runs at least in part inside the light-conducting structure, and wherein the second light-measuring path satisfies at least one of the following conditions:
  the second light-measuring path runs over its entire path length inside and at a distance from an outer surface of the sensor housing;
  no portion of the light running along the second light-measuring path leaves the sensor housing;
  no portion of the light running along the second light-measuring path passes through a space outside the housing which would be fluidically connected to the measuring space outside the housing;
  an intensity of light which is received by the second light-receiving element via the second light-measuring path is unaffected by a medium through which the first light-measuring path passes in the measuring space outside the housing.

According to a further example there is provided a sensor arrangement for optical transmission measurements in a domestic electrical appliance, comprising a sensor having a sensor housing and, accommodated therein, a light-emitting component arrangement and two light-receiving elements, wherein the sensor defines two light-measuring paths, of which a first transports light from the light-emitting component arrangement to a first of the light-receiving elements but not to the second of the light-receiving elements, and the second light-measuring path transports light from the light-emitting component arrangement to the second of the light-receiving elements but not to the first of the light-receiving elements, wherein the first light-measuring path passes over a portion of its path length through a measuring space outside the housing, wherein the sensor arrangement comprises a printed circuit board on which the first light-receiving element and the second light-receiving element are arranged, wherein there is arranged on the printed circuit board a thermal coupling layer which extends between the first light-receiving element and the second light-receiving element, and wherein the second light-measuring path satisfies at least one of the following conditions:
  the second light-measuring path runs over its entire path length inside and at a distance from an outer surface of the sensor housing;
  no portion of the light running along the second light-measuring path leaves the sensor housing;
  no portion of the light running along the second light-measuring path passes through a space outside the housing which would be fluidically connected to the measuring space outside the housing;
  an intensity of light which is received by the second light-receiving element via the second light-measuring path is unaffected by a medium through which the first light-measuring path passes in the measuring space outside the housing. In this example, the thermal coupling layer, or the heat-equalizing element, can be so designed that the first light-receiving element and the second light-receiving element have substantially the same temperature at any time during an operating program of the domestic appliance. The thermal coupling layer can be designed as part of an electric circuit which is current-carrying during operation of the sensor. The light-receiving elements can be in the form of light detectors, and the thermal coupling layer can be connected to one or more electrical contacts of at least one of the two light detectors.

According to a further aspect, the invention provides a domestic electrical appliance, in particular a washing machine or a dishwasher, comprising an appliance body having a wet chamber formed therein and a sensor arrangement of the type described hereinbefore. In the case of a domestic washing machine, the wet chamber is, for example, a receiving chamber for the wash water formed in a liquor container (tub); in the case of a domestic dishwasher, the wet chamber is, for example, formed by a pump well arranged beneath the dishwashing chamber, in which the dishwashing liquor accumulates before it is pumped back into the dishwashing chamber or is pumped away via a discharge channel. The sensor housing projects with at least a portion of its outer surface into the wet chamber in such a manner that the measuring space outside the housing is formed in the wet chamber.

BRIEF DESCRIPTION OF THE DRAWINGS

The invention will be explained further hereinbelow with reference to the accompanying drawings, in which:

FIG. 7 shows the course of light-measuring paths in the light-conducting structure of FIG. 6; and FIG. 8 is a schematic illustration of a domestic electrical appliance according to an exemplary embodiment.

DETAILED DESCRIPTION

In the following, unless indicated otherwise, identical reference signs denote elements which are structurally or/and functionally identical or have an identical action. The exemplary embodiments described hereinbelow disclose a sensor suitable for optical turbidity measurements, which is suitable for use in a water-bearing domestic electrical appliance (e.g. washing machine or dishwasher) and allows the temperature dependence of the turbidity measurements obtained by means of a first light detector to be compensated for. To this end, the sensor implements, in addition to a turbidity-measuring path along which a measuring-light beam is sent through a measuring space containing the turbid medium to a first light detector, a reference measuring path along which a reference light beam is transported to a second light detector which is thermally coupled with the first light detector. The reference light beam is preferably not exposed to the turbid medium and is therefore independent of the turbidity, but the reference measurement signal emitted by the second light detector can be subject substantially to the same temperature dependence as the turbidity-measuring signal emitted by the first light detector. The temperature dependence of the turbidity measurements of the turbidity-measuring path can be eliminated or at least reduced by forming the difference or/and the quotient of the measured values of the two light detectors.

Figure 1:
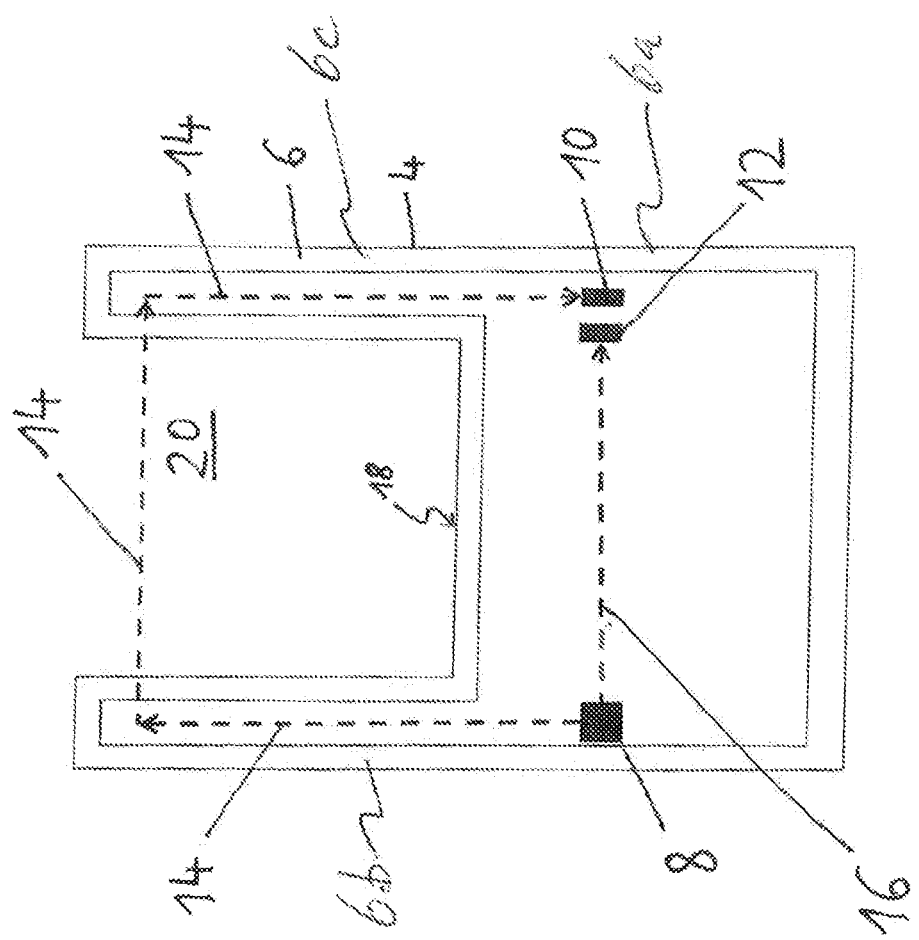
FIG. 1 is a schematic illustration of a sensor suitable for optical turbidity measurements according to an exemplary embodiment.

Reference will first be made to FIG. 1. The optical sensor, designated 4, illustrated therein comprises a sensor housing 6 and, accommodated therein, a light source 8 and two light detectors 10, 12. The sensor housing 6 has a housing main part 6a, from which two housing fingers 6b, 6c protrude in substantially the same direction but with a mutual spacing. The housing main part 6a is pot-shaped, for example, wherein the two housing fingers 6b, 6c protrude from the pot base of the housing main part 6a. From the pot opening of the housing main part 6a opposite the pot base (located at the lower end of the sensor housing 6 in the illustration of FIG. 1), a connector plug, not shown in detail in the figures, connected to an electrical connection cable can be attached to the sensor 4.

The sensor 4 defines two light-measuring paths 14, 16, of which the light-measuring path 14 (first light-measuring path) transports light from the light source 8 to a first of the light detectors 10 but not to the second of the light detectors 12, and the light-measuring path 16 (second light-measuring path) transports light from the light source 8 to the second of the light detectors 12 but not to the first of the light detectors 10. In the example shown, the light source 8 is formed by a single light source, for example a light-emitting diode (LED), that is to say by a light-emitting component common to both light-measuring paths 14, 16. Such a single light source is suitable for feeding light to both light-measuring paths 14, 16 by light division or beam splitting, wherein the light division to the two light-measuring paths 14, 16 can be carried out directly at the light source 8 in that light that is radiated from the light source 8 in a first solid angle range is directed to the first light-measuring path 14 and light that is radiated from the light source 8 in a separate second solid angle range is directed to the second light-measuring path 16. Alternatively, it is conceivable that the two light-measuring paths 14, 16 first run along a common part-distance, that is to say overlapping, and beam splitting takes place only at a point at a distance from the light source 8. As an alternative to the single light source 8, it is conceivable to provide, in association with each of the light-measuring paths 14, 16, a separate light source in the sensor 4. One of these light sources then feeds light to the light-measuring path 14, while the other of the light sources feeds light to the light-measuring path 16. In such a case, it is preferred if the two light sources have substantially identical radiation characteristics (e.g. light intensity, wavelength spectrum and/or angle of radiation).

In the example shown, the first light-measuring path 14 forms the actual turbidity-measuring path; it runs over a portion of its path length outside the sensor housing 6. By contrast, in the example shown, the second light-measuring path 16 runs over its entire path length inside and at a distance from an outer surface 18 of the sensor housing 6. An intensity of light which is received by the second light-receiving element 12 via the second light-measuring path 16 is thus independent of the optical properties of a medium in a measuring space 20 formed outside the sensor housing 6 between the two housing fingers 6b, 6c, through which the first light-measuring path 14 runs over a portion of its path length outside the housing 6. The light-measuring path 16 accordingly forms a reference measuring path, which serves to compensate for the temperature dependence of the turbidity-measuring path 14. The medium outside the housing in the measuring space 20 corresponds, for example, to the working medium of a water-bearing domestic appliance (not shown), that is to say in the case of a washing machine to the wash water and in the case of a dishwasher to the dishwashing liquor.

Figure 2:
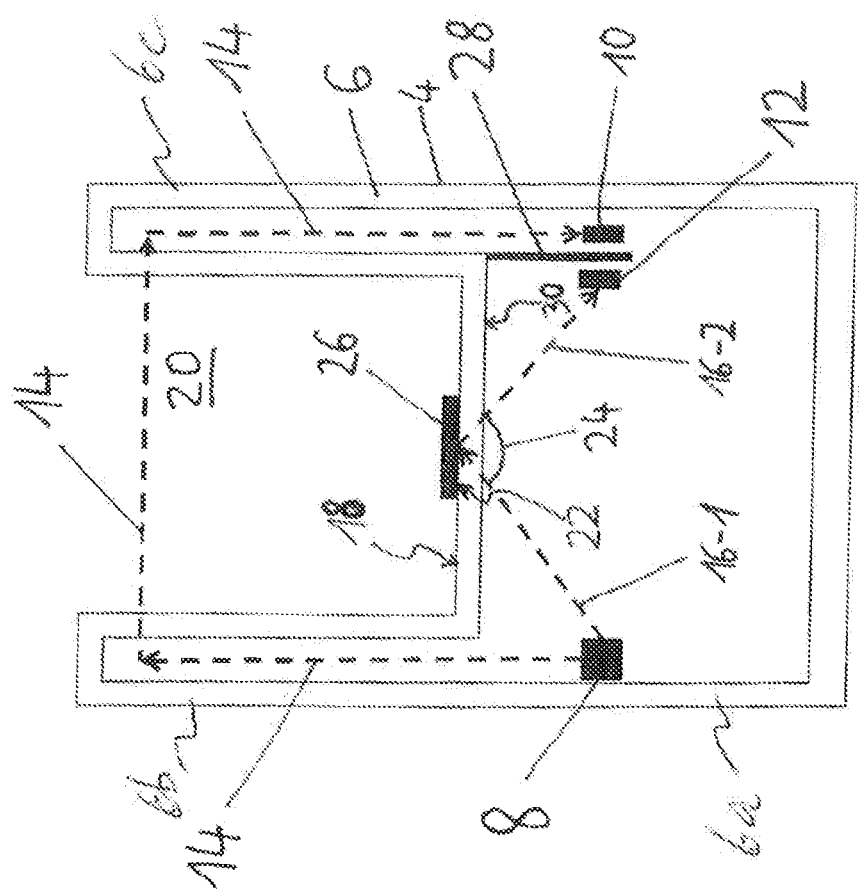
FIG. 2 is a schematic illustration of an optical sensor according to a further exemplary embodiment.

In the exemplary embodiment according to FIG. 2, the sensor 4 comprises a reflection face 22, wherein a first path portion 16-1 of the second light-measuring path 16 forms at the reflection face 22 an angle 24 which is greater than 0° and less than 180° relative to an adjoining second path portion 16-2 of the second light-measuring path 16. In the example shown, the reflection face extends substantially parallel with respect to the portion of the first light-measuring path 14 that runs outside the sensor housing 6. In the case shown, the reflection face 22 is additionally formed by a reflection element 26 applied to the outer surface 18 of the sensor housing 6 and is so configured that it reflects light transported by the second light-measuring path 16 substantially completely by mirror reflection.

The sensor 4 of FIG. 2 further comprises a light-impermeable separating wall 28 arranged in the interior of the sensor housing 6, which separating wall extends at least in part between an end segment of the light-measuring path 14 ending at the light detector 10 and an end segment of the light-measuring path 16 ending at the light detector 12. In the example shown, the separating wall 28 extends substantially parallel to the end segment of the light-measuring path 14. The separating wall 28 can alternatively or additionally extend substantially parallel to the end segment of the light-measuring path 16.

It is to be noted that the reflection face 22 can also be formed spaced apart from the outer surface 18 of the sensor housing 6, for example by the reflection element 26. A layer of the reflection element 26 attached to the outer surface 18 of the sensor housing 6 can thus be manufactured from a transparent material and the reflection face 22 can be positioned on the transparent material. An example of such a reflection element 26 is a glass plate with a metallized rear side, wherein the glass plate is attached to the outer surface 18 of the sensor housing.

Alternatively, the light-measuring path 16 can run at least in part outside the housing 6 without light transported by the light-measuring path 16 being transported to the light detector 12 by reflection at a reflection face located outside and spaced apart from the outer surface 18 of the sensor housing 6.

When the light-measuring path 16 runs at least in part outside the sensor housing 6, each portion of the light-measuring path 16 that runs outside the sensor housing 6 runs solely through one or more solid bodies (e.g. through the glass plate of the reflection element 26). At the same time or alternatively, each portion of the light-measuring path 16 that runs outside the sensor housing 6 runs solely through one or more media (e.g. glass or plastics material) which differ from the medium outside the housing in the measuring space 20 (e.g. the working medium), through which the light-measuring path 14 runs over the portion of its path length outside the housing 6. In both cases, an intensity of light which is received by the light detector 12 via the light-measuring path 16 is independent of optical properties (e.g. transmittance, refractive index and/or polarization properties) of the medium in the measuring space 20, through which the light-measuring path 14 runs.

The reflection face 22 can alternatively be arranged inside the housing 6. To this end, the reflection element 26 can be fixed to an inner surface 30 of the sensor housing 6, for example. In this case, the light-measuring path 16 runs, for example, over its entire path length inside and at a distance from an outer surface 18 of the sensor housing 6. Here too, an intensity of light which is received by the light detector 12 via the light-measuring path 16 is thus independent of the optical properties of the medium in the measuring space 20, through which the light-measuring path 14 runs outside the housing 6.

Figure 3:
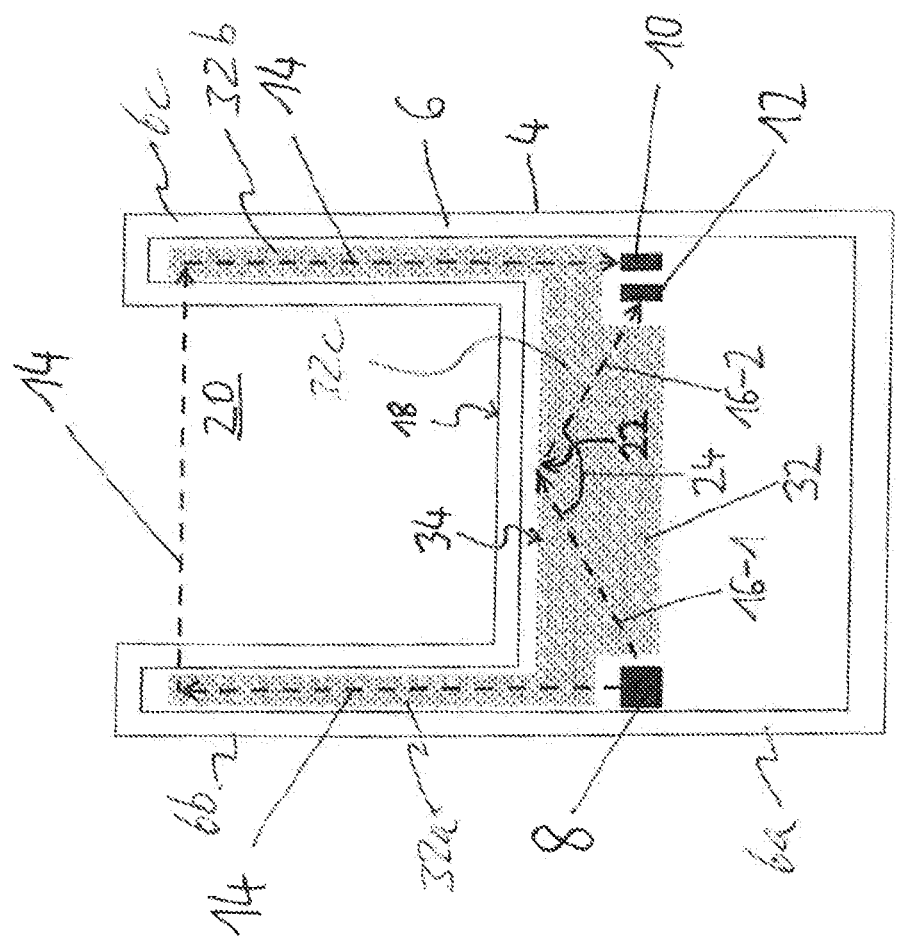
FIG. 3 is a schematic illustration of an optical sensor according to yet a further exemplary embodiment.

In the exemplary embodiment of FIG. 3, the sensor 4 comprises a light-conducting structure 32 which is arranged in the sensor housing 6 and is formed of a light-permeable material, in particular transparent material, which light-conducting structure has two light-conducting fingers 32a, 32b and a light-conducting base 32c connecting the two light-conducting fingers 32a, 32b. Each of the two light-conducting fingers 32a, 32b extends into one of the housing fingers 6b, 6c, wherein the light-conducting base 32c fills the pot-like housing main part 6a substantially over the entire pot cross section thereof. The first path portion 16-1 and the second path portion 16-2 of the second light-measuring path 16 run at least in part inside the light-conducting base 32c, but without entering the light-conducting fingers 32a, 32b. In the example shown, an outer surface 34 of the light-conducting base 32c serves as a totally reflecting reflection face for light transported along the light-measuring path 16. Alternatively, it is conceivable to apply a reflective coating to the light-conducting base 32c locally on its outer surface 34 in the region between the two housing fingers 6b, 6c, for example by vapor deposition of a metallization layer or by adhesive bonding of a metal foil, in order to achieve in the mirrored surface portion the desired reflection of the light transported along the light-measuring path 16. In the example shown, the light-measuring path 14 runs through the two light-conducting fingers 32a, 32b.

The sensor 4 can comprise a beam splitter (not shown) which divides light emitted by the light source 8 into at least two beams running in different directions. A first of the at least two beams can feed the light-measuring path 14, and a second of the at least two beams can feed the light-measuring path 16. For example, the beam splitter can be part of the light-conducting structure 32 or be formed thereby.

Figure 4:
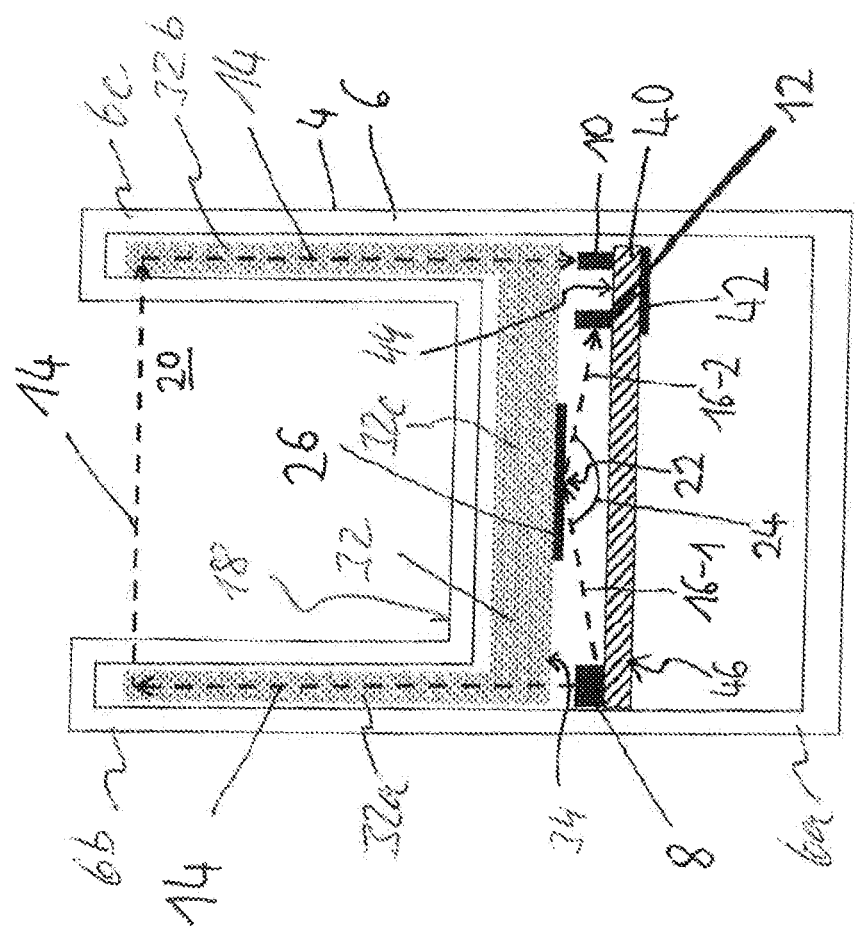
FIG. 4 is a schematic illustration of an optical sensor according to yet a further exemplary embodiment.

In the exemplary embodiment of FIG. 4, the light-measuring path 14, as in the exemplary embodiment of FIG. 3, runs through the two light-conducting fingers 32a, 32b, but the light-measuring path 16 does not run through the light-conducting structure 32. Instead, the reflection face 22 is formed on the lower side, remote from the measuring space 20, of the outer surface 34 of the light-conducting base 32c by application of the reflection element 26. Both the first path portion 16-1 and the second path portion 16-2 of the light-measuring path 16 run wholly outside the light-conducting structure 32 in the example shown. In the exemplary embodiments of FIGS. 3 and 4, the light-conducting structure 32 can be manufactured, for example, from a glass material or a transparent plastics material (e.g. polymethylmethacrylate, PMMA for short).

The light detectors 10, 12 can be formed, for example, by photodiodes or phototransistors. In order that the two light detectors 10, 12 exhibit as uniform as possible a temperature behavior of their electrical detection signal (detection voltage), it is recommended to use for the light detectors 10, 12 components which are nominally identical in terms of their optoelectronic properties and expediently also come from the same manufacturing batch. Any manufacturing-related tolerances of the electrooptical properties of the light detectors 10, 12 can thus be minimized as far as possible.

In the exemplary configuration according to FIG. 4, the sensor 4 comprises a printed circuit board 40, on which the two light detectors 10, 12 are arranged close to one another (e.g. at a distance of less than 1 cm, for example less than 5 mm). The light source 8 can also be arranged on the printed circuit board 40.

On the printed circuit board 40 there is arranged a layer 42 of a material with high thermal conductivity (e.g. more than 350 W/m*K), which extends between the light detector 10 and the light detector 12. In the example shown, the two light detectors 10, 12 are arranged on an upper side 46 of the printed circuit board 40, while the layer 42 is arranged on a lower side 46 of the printed circuit board 40. The layer 42 extends on the lower side 46 of the printed circuit board 40 at least between a region located beneath the light detector 10 and a region located beneath the light detector 12. The layer 42 can be formed by one or more conductive tracks on the printed circuit board 40 and/or can consist of copper or a copper alloy. For example, the layer 42 is so designed that it is not current-carrying during operation of the sensor 4. Alternatively, the layer 42 is designed as part of an electric circuit which is current-carrying during operation of the sensor 4. The layer 42 can be connected to one or more electrical contacts of at least one of the two light detectors 10, 12. The layer 42 can provide for thermal coupling of the two light detectors 10, 12, so that they always have substantially the same temperature. The layer 42 may also be referred to as a heat-equalizing element.

Figure 5:
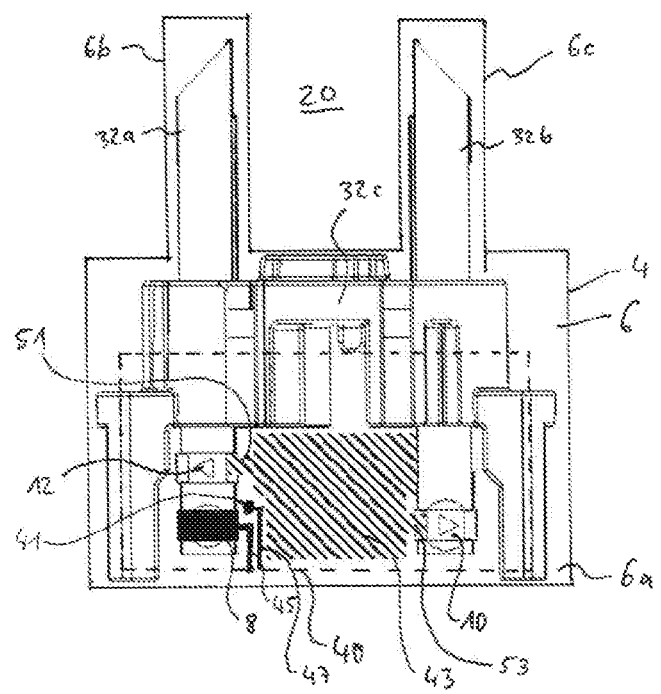
FIG. 5 is a schematic illustration of an optical sensor according to yet a further exemplary embodiment.

In the exemplary embodiment according to FIG. 5, the printed circuit board 40 runs substantially in a plane with the housing fingers 6a, 6b and the light-conducting fingers 32a, 32b. The outer contour of the printed circuit board 40 is indicated as a broken line in FIG. 5. The light detectors are in the form of surface-mounted components, so-called SMDs. The light emitted by the light source 8 is radiated out of the plane of the drawing in the direction towards the viewer, that is to say perpendicular to the surface of the printed circuit board 40. The light detected by the light-receiving elements 10, 12 strikes those elements in the opposite direction. As can be seen, the second light detector 12 is arranged immediately next to the light source 8, in particular beneath the same finger 32a. This extends not only into the housing finger 6a but also in the housing main part over the light source 8 and the light detector 12. Likewise, the light-conducting finger 32b extends not only into the housing finger 6c but also in the housing main part to over the light detector 10.

A heat-equalizing element 43 is arranged on the printed circuit board 40 and between the first light-receiving element 10 and the second light-receiving element 12. The heat-equalizing element 43 thus extends on the printed circuit board 40 from the first light-receiving element 10 to the second light-receiving element 12. The heat-equalizing element 43 serves to minimize, by heat transport between the light-receiving elements 10, 12, any temperature differences which may occur between those elements. In particular when the elements 10, 12 are identically constructed or come from the same manufacturing batch, their measurements have extremely similar temperature dependencies. When the two light detectors 10, 12 have the same temperature, an undesirable temperature influence on the turbidity measurement and the reference measurement can be minimized. Ultimately, the turbidity of the measuring medium can thus be determined more accurately.

The heat-equalizing element 43 is a portion of the conductive layer of the printed circuit board, of which the conductive tracks 45, 47 also consist. The heat-equalizing element 43 therefore also has exactly the same thickness as the conductive tracks 45, 47. Layer thicknesses of 18 μm, 35 μm, 70 μm or 105 μm and copper or a copper alloy are usually used therefor. In the present exemplary embodiment, the heat-equalizing element 43 and the two light-receiving elements 10, 12 are fixed to the same surface of the printed circuit board 40, which in FIG. 5 faces in the direction of the viewer. This allows the heat-equalizing element 43 to be produced very inexpensively and compactly.

In order to ensure temperature equalization, it is advantageous if the heat-equalizing element permits high heat transport. The heat-equalizing element can thus cover a large proportion of the surface of the printed circuit board 40 (e.g. 20%, 30%, 40% or even 50%). For example, the heat-equalizing element 43 covers an area of the printed circuit board which is larger than an area covered by at least one of the light-receiving elements 10, 12. For example, the heat-equalizing element 43 covers an area of 5 mm$^2$, ≥10 mm$^2$, ≥15 mm$^2$ or ≥20 mm$^2$.

In particular, the heat-equalizing element 43 can extend over a largest possible cohesive surface region of the printed circuit board 40. This surface region should be free of components and conductive tracks fixed to the printed circuit board 40. In the example of FIG. 5, an electrical component 41 (e.g. a resistor, a capacitor or a transistor) is arranged on the printed circuit board 40. Conductive tracks 45, 47 are also provided. It will be seen that the region of the printed circuit board 40 that is occupied by the component 41 and the conductive tracks 45, 47 is free of the heat-equalizing element 43.

In contrast to conventional conductive tracks, the heat-equalizing element 43 here has a variable width. In particular, the heat-equalizing element 43 is wider, in at least a part-region or overall, than a conventional conductive track, in particular wider than the conductive tracks provided on the printed circuit board 40 (e.g. the conductive tracks 45 and 47). As illustrated in FIG. 5, the heat-equalizing element 43 is at its narrowest in the regions that are adjacent to the light-receiving elements 10, 12. These regions can be wider than other or all the conductive tracks arranged on the printed circuit board 40 (e.g. the conductive tracks 45 and 47).

The heat-equalizing element 43 can comprise a rectangular middle portion, wherein a width of the middle portion is the same as or greater than an offset (e.g. in the longitudinal direction of one or both light-conducting fingers 32a, 32b) of the light-receiving elements 10, 12. A length of the middle portion can correspond to a large proportion of the distance between the light-conducting fingers 32a, 32b (e.g. 70%, 80% or 90%). This allows, for example, the length of the narrowest regions of the heat-equalizing element 43 to be minimized, whereby heat transport can be improved further.

The heat-equalizing element 43 is in particular a passive element and can nevertheless be part of an electric circuit. The heat-equalizing element 43 can be current-carrying or provide a reference potential during operation of the domestic appliance. In particular, the heat-equalizing element 43 can provide an electrical connection of one or more elements arranged on the printed circuit board 40. In the example shown, the heat-equalizing element 43 comprises two terminal portions 51, 53. The portion 51 is connected to an electrode 12a of the light detector 12, and the portion 53 is connected to an electrode 10a of the light detector 10. In particular, the respective electrodes 10a, 12a are fixedly soldered to the portions 51, 53. The electrodes 10a, 12a can be planar contact pads. The portions 51, 53 correspond to the above-described narrowest regions of the heat-equalizing element 43 and can have, for example, a width of 2 mm, 1.5 mm or 1 mm.

As is indicated in FIG. 5, each of the terminal portions 51, 53 is exactly as wide as the electrode 10a, 12a fixed thereon. This ensures on the one hand secure fixing of the light detectors 10, 12 and on the other hand maximum heat transport by the heat-equalizing element 43. In one example, each of the light detectors 10, 12 comprises a phototransistor, and the two electrodes 10a, 12a connected to the heat-equalizing element 43 are cathodes of the phototransistors, or are electrically connected thereto.

The heat-equalizing element 43 can thus be adapted to place the electrodes 10a, 12a of the two light-receiving elements 10, 12 at the same potential, or to prevent a potential difference between the electrodes. In this case, the heat-equalizing element 43 performs a dual function in that it keeps not only the temperature but also the electric potential at the two electrodes almost identical. A more compact construction can thus be achieved, since an additional electrical conductive track to the respective cathodes is not required.

Figure 6:
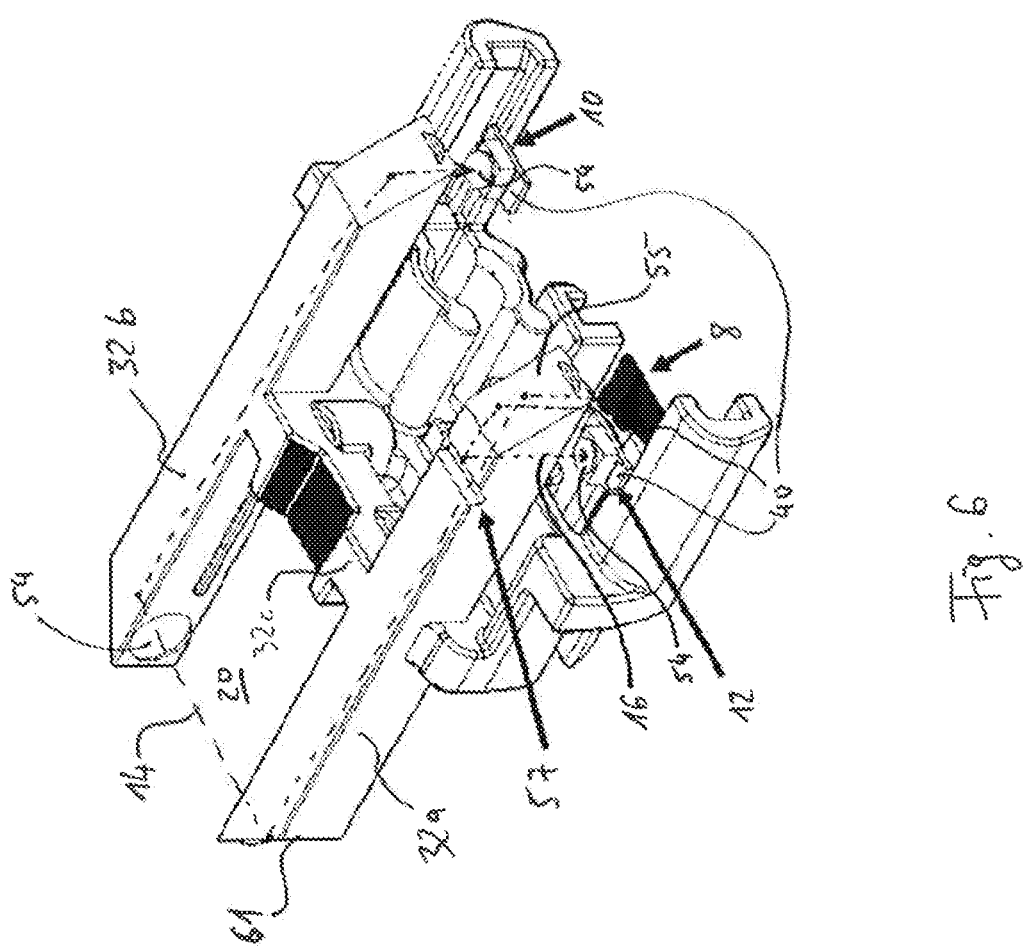
FIG. 6 is a perspective view of a light-conducting structure of the optical sensor from FIG. 5.

FIG. 6 shows the light-conducting structure from the exemplary embodiment of FIG. 5 in a perspective view. The printed circuit board 40 is illustrated only in part beneath the light detectors 10, 12 and the light source 8; the housing 6 is not illustrated. It can be seen in particular that the light-conducting fingers 32a, 32b extend over the respective light detectors 10, 12. The light source 8, in the form of a SMD, emits light which penetrates the light-conducting finger 32a. To this end, optical collecting or collimation lenses 54 can be used, which are arranged, for example, at the light source 8, at a light inlet region of the respective light-conducting finger 32a, 32b or/and at a light outlet region of the respective light-conducting finger 32a, 32b.

FIGS. 6 and 7 further show a course of the light-measuring paths 14, 16 inside the light-conducting finger 32a. The light coupled into the light-conducting finger 32a is reflected in the longitudinal direction of the light-conducting finger 32a at an end face 55 of the light-conducting finger 32a by total internal reflection.

An indentation 57 is provided in the surface of the light-conducting finger 32a shown at the top in FIGS. 6 and 7. The indentation 57 is thus remote from the surface of the light-conducting finger 32a into which the light is coupled. A portion of the light reflected at the end face 55 is reflected at the reflection face 59 formed by the indentation 57, in particular by total internal reflection. The indentation 57 is so configured that this light portion reflected there is conducted along the second light-measuring path 16 (downwards in FIGS. 6 and 7). It can thus be said that only light that is transported along the second light-measuring path 16 is reflected at the reflection face 59.

At a distal end of the light-conducting finger 32a, the light-conducting finger has an end face 61. This end face is located at the other end of the light-conducting finger 32a from the end face 55. Only light that is transported along the first light-measuring path 14 is reflected at the end face 61. The end face 61 is at an angle relative to the reflection surface 59. The light is reflected at the end face 61 substantially orthogonally relative to light that has been reflected at the reflection surface 59. In summary, it can be said that light that is transported along the first light-measuring path 14 and light that is transported along the second light-measuring path 16 is reflected at the end face 55. By contrast, the reflection surface 59 of the indentation 57 serves to reflect only light transported along the second light-measuring path 16, and the end face 61 serves to reflect only light transported along the first light-measuring path 59.

The course of the light-measuring paths 14, 16 will now be described again in a different way. A portion of the first light-measuring path 14 beginning at the light-emitting element 8 and a portion of the second light-measuring path 16 beginning at the light-emitting element 8 run at an angle, in particular orthogonally, relative to a longitudinal direction of at least one of the light-conducting fingers 32a, 32b. The light is thus coupled into the light-conducting finger 32a perpendicularly to the lateral face thereof. The first light-measuring path 14 runs in multiple different planes, while the second light-measuring path 16 runs wholly in a single reference measuring path plane. The portion of the first light-measuring path 14 that passes through the measuring space outside the housing runs not in the reference measuring path plane but in particular orthogonally thereto. The first light-measuring path 14 runs in the light-conducting finger 32a substantially parallel to the reference measuring path plane.

By construction outlined with reference to FIGS. 6 and 7, the light detectors 10, 12 and the light source 8 can be in the form of SMDs and arranged on the same printed circuit board 40. In particular, a compact construction is made possible.

FIG. 8 shows a highly schematic illustration of a water-bearing domestic electrical appliance 48, which comprises an appliance body 49 in which the measuring space 20 of FIGS. 1 to 6 is formed. The domestic appliance 48 will generally have a door (not shown in greater detail) which is movably, for example pivotably, mounted on the appliance body 49 and by means of which an access opening to a process chamber of the domestic appliance can be closed. The process chamber is, for example, in the case of a washing machine the interior of a wash drum, into which the user can place his laundry, or in the case of a dishwasher the dishwashing chamber, into which the dishes to be cleaned are placed. The measuring space 20 is part of the process chamber or is fluidically connected to the process chamber. The domestic appliance 48 comprises, in addition to the sensor 4, a signal evaluation unit 50, for example a processor-based signal evaluation unit, which is adapted to determine a derived measured value from a first measured value, which is representative of a light intensity received at the light detector 10, and a second measured value, which is representative of a light intensity received at the light detector 12, by forming a difference or a quotient of the first and the second measured values. The domestic appliance 48 further comprises according to FIG. 8 an electronic control unit 52, which is adapted to control the operation of the domestic appliance 48 on the basis of the derived measured value. The derived measured value can represent a temperature-compensated measured value for the turbidity of the medium in the measuring space 20.

In the example shown, the signal evaluation unit 50 is connected to the sensor 4 of the sensor arrangement, and the electronic control unit 52 is connected to the signal evaluation unit 50. The signal evaluation unit 50 can be part of the sensor 4 or can be integrated in a control unit outside the sensor, for example in the electronic control unit 52.

Further examples will be explained hereinbelow.

Example 1

Sensor arrangement for optical transmission measurements in a domestic electrical appliance, comprising a sensor having a sensor housing and, accommodated therein, a light-emitting component arrangement and two light-receiving elements, wherein the sensor defines two light-measuring paths, of which a first transports light from the light-emitting component arrangement to a first of the light-receiving elements but not to the second of the light-receiving elements, and the second light-measuring path transports light from the light-emitting component arrangement to the second of the light-receiving elements but not to the first of the light-receiving elements, wherein the first light-measuring path passes over a portion of its path length through a measuring space outside the housing, and wherein the second light-measuring path satisfies at least one of the following conditions:

the second light-measuring path runs over its entire path length inside and at a distance from an outer surface of the sensor housing;

no portion of the light running along the second light-measuring path leaves the sensor housing;

no portion of the light running along the second light-measuring path passes through a space outside the housing which would be fluidically connected to the measuring space outside the housing;

an intensity of light which is received by the second light-receiving element via the second light-measuring path is unaffected by a medium through which the first light-measuring path passes in the measuring space outside the housing.

Example 2

Sensor arrangement according to Example 1, wherein the light-emitting component arrangement comprises a light-emitting element for jointly feeding light to the two light-measuring paths.

Example 3

Sensor arrangement according to Example 1 or 2, comprising a signal evaluation unit, in particular a processor-based signal evaluation unit, which is adapted to determine a derived measured value from a first measured value, which is representative of a light intensity received at the first light-receiving element, and a second measured value, which is representative of a light intensity received at the second light-receiving element, by forming a difference or a quotient of the first and the second measured values.

Example 4

Sensor arrangement according to Example 3, comprising an electronic control unit which is adapted to control the operation of the domestic appliance on the basis of the derived measured value.

Example 5

Sensor arrangement according to one of Examples 1 to 4, wherein the sensor housing has a housing main part having two housing fingers protruding from the housing main part, wherein the measuring space outside the housing is arranged between the two housing fingers, and wherein the first light-measuring path emerges from a first of the housing fingers into the measuring space outside the housing and, after passing through the measuring space outside the housing, enters the second of the housing fingers.

Example 6

Sensor arrangement according to Example 5, wherein the second light-measuring path does not run in one of the housing fingers at any point of its path length.

Example 7

Sensor arrangement according to Example 5 or 6, comprising a reflection face formed on the sensor housing or on a light-conducting structure inserted into the sensor housing, for the mirror reflection or total reflection of the light running along the second light-measuring path, in particular at a point in a region between the two housing fingers.

Example 8

Sensor arrangement according to one of Examples 5 to 7, wherein there is inserted into the sensor housing a solid-material light-conducting structure which, in association with each of the housing fingers, forms a light-conducting finger projecting into the housing finger in question, wherein both the light-emitting component arrangement and the first and the second light-receiving elements are arranged in the housing main part.

Example 9

Sensor arrangement according to one of the preceding examples, comprising a printed circuit board having two photodetector components mounted thereon, each forming one of the two light-receiving elements, wherein the photodetector components have a clear mutual spacing of not more than 1.0 cm or not more than 0.8 cm or not more than 0.6 cm.

Example 10

Domestic electrical appliance, in particular washing machine or dishwasher, comprising an appliance body having a wet chamber formed therein, and a sensor arrangement according to one of Examples 1 to 9, wherein the sensor housing projects into the wet chamber with at least a portion of its outer surface, in such a manner that the measuring space outside the housing is formed in the wet chamber.

Features of the exemplary configurations, embodiments and examples described hereinbefore can be combined with one another. Thus, for example, the sensor 4 can have two different reflection faces 22, of which a first is formed as shown in FIG. 2 and a second is formed as shown in FIG. 3, so that light transported by the light path 16 is reflected multiple times before it reaches the light detector 12. Each of the exemplary configurations described herein can comprise the reflection layer 22, the reflection element 26, the separating wall 28, the beam splitter, the light-conducting structure 32, the printed circuit board 40, the layer 42, the signal evaluation unit 50 and/or the electronic control unit 52 as well as further of the elements described herein.

What is claimed is:

1. A sensor for performing optical transmission measurements in a domestic electrical appliance, the sensor comprising:
    a sensor housing;
    a light source accommodated in the sensor housing;
    a first light detector and a second light detector, both accommodated in the sensor housing, wherein the first light detector is arranged at an end of a first light-measuring path which begins at the light source and passes over a portion of its path length through a measuring space that lies outside the sensor housing, wherein the second light detector is arranged at an end of a second light-measuring path which begins at the light source and runs wholly outside the measuring space that lies outside the sensor housing; and
    a printed circuit board on which the first and second light detectors are mounted, wherein a passive heat-equalizing element is disposed on the printed circuit board between the first light detector and the second light detector.

2. The sensor as claimed in claim 1, wherein the heat-equalizing element comprises conductive track material of the printed circuit board, is of planar form and has a layer thickness which corresponds to a layer thickness of a conductive track of the printed circuit board.

3. The sensor as claimed in claim 1, wherein the heat-equalizing element and the first and second light detectors are arranged on the same side of the printed circuit board.

4. The sensor as claimed in claim 1, wherein the heat-equalizing element extends over a largest possible cohesive surface region of the printed circuit board which is free of mounted components and conductive tracks.

5. The sensor as claimed in claim 2, wherein the heat-equalizing element has at a widest point a width which is greater than a maximum width of the conductive track arranged on the printed circuit board.

6. The sensor as claimed in claim 1, wherein the width of the heat-equalizing element in a first region which adjoins one of the first and second light detectors is smaller than in a second region which is spaced further apart from the one of the first and second light detectors.

7. The sensor as claimed in claim 1, wherein the heat-equalizing element is adapted to keep a temperature difference between the first and second light detectors that is caused by temperature changes of a medium in the measuring space during a working cycle of the domestic appliance below a predetermined maximum temperature difference.

8. The sensor as claimed in claim 1, wherein the heat-equalizing element is part of an electric circuit.

9. The sensor arrangement as claimed in claim 1, wherein the heat-equalizing element comprises a terminal portion which is connected to an electrode of one of the first and second light detectors.

10. The sensor as claimed in claim 9, wherein the terminal portion has a width corresponding to a width of the electrode.

11. The sensor as claimed in claim 9, wherein the electrode is a cathode of a phototransistor of the one of the first and second light detectors.

12. A sensor for performing optical transmission measurements in a domestic electrical appliance, the sensor comprising:
a sensor housing;
a light source accommodated in the sensor housing;
a first light detector and a second light detector, both accommodated in the sensor housing, wherein the first light detector is arranged at an end of a first light-measuring path which begins at the light source and passes over a portion of its path length through a measuring space that lies outside the sensor housing, wherein the second light detector is arranged at an end of a second light-measuring path which begins at the light source and runs wholly outside the measuring space that lies outside the sensor housing; and
a solid-material light-conducting structure, wherein both the first light-measuring path and the second light-measuring path extend at least partially inside the light-conducting structure.

13. The sensor as claimed in claim 12, wherein the light-conducting structure has a first reflection face at which only light transported along the second light-measuring path is reflected.

14. The sensor as claimed in claim 13, wherein the first reflection face is so configured that the light transported along the second light-measuring path is reflected at the first reflection face by total internal reflection.

15. The sensor as claimed in claim 13, wherein a surface of the light-conducting structure comprises an indentation, wherein the indentation forms the first reflection face.

16. The sensor as claimed in claim 13, wherein the light-conducting structure further has a second reflection face at which only light transported along the first light-measuring path is reflected.

17. The sensor as claimed in claim 16, wherein the first and the second reflective faces are so configured that light emitted along the second light-measuring path and reflected at the first reflection face runs in a different plane to light emitted along the first light-measuring path and reflected at the second reflection face.

18. A sensor for performing optical transmission measurements in a domestic electrical appliance, the sensor comprising:
a sensor housing;
a light source accommodated in the sensor housing;
a first light detector and a second light detector, both accommodated in the sensor housing, wherein the first light detector is arranged at an end of a first light-measuring path which begins at the light source and passes over a portion of its path length through a measuring space that lies outside the sensor housing, wherein the second light detector is arranged at an end of a second light-measuring path which begins at the light source and runs wholly outside the measuring space that lies outside the sensor housing; and
a first reflection face at which light emitted along the second light-measuring path is reflected by total reflection.

19. The sensor of claim 18, wherein the light emitted along the second light-measuring path is reflected at the first reflection face by total internal reflection.

* * * * *